United States Patent
Toshima et al.

(10) Patent No.: US 6,632,524 B1
(45) Date of Patent: Oct. 14, 2003

(54) NICKEL POWDER, METHOD FOR PREPARING THE SAME AND PASTE FOR USE IN MAKING ELECTRODES FOR ELECTRONIC PARTS

(75) Inventors: Yoshiharu Toshima, Yamaguchi (JP); Takao Hayashi, Yamaguchi (JP); Yasuhide Yamaguchi, Yamaguchi (JP); Hiroyuki Shimamura, Tokyo (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 124 days.

(21) Appl. No.: 09/716,238

(22) Filed: Nov. 21, 2000

(30) Foreign Application Priority Data

Nov. 22, 1999 (JP) .......................................... 11-331482
Jun. 13, 2000 (JP) ....................................... 2000-176838

(51) Int. Cl.$^7$ ........................... B32B 15/02; H01B 1/02; H01B 1/14; H01B 1/16
(52) U.S. Cl. ....................... 428/357; 428/403; 428/402; 252/512; 252/513
(58) Field of Search ................................ 428/402, 403, 428/323, 332, 357, 513, 407, 328; 252/512, 513

(56) References Cited

U.S. PATENT DOCUMENTS

| | | | | |
|---|---|---|---|---|
| 4,906,596 A | * | 3/1990 | Joslin et al. | 501/17 |
| 6,120,576 A | * | 9/2000 | Toshima et al. | 75/370 |
| 6,316,100 B1 | * | 11/2001 | Kodas et al. | 428/357 |

FOREIGN PATENT DOCUMENTS

JP     11152507    *   8/1999

* cited by examiner

Primary Examiner—Paul Thibodeau
Assistant Examiner—Nikolas J Uhlir
(74) Attorney, Agent, or Firm—Young & Thompson

(57) ABSTRACT

Nickel powder comprises, on the basis of the total number of particles, not less than 10% of particles whose particle size is not less than 1.2 time the average particle size, as determined by the SEM observation; and not less than 10% of particles whose particle size is not more than 0.8 time the average particle size, as determined by the SEM observation. The nickel powder can be prepared by, for instance, precipitating nickel particles from an aqueous solution containing a nickel salt and a hydrazine reducing agent, without forming any hydroxide of nickel as an intermediate.

A conductive paste containing the nickel powder can be applied onto the positions on which an internal or external electrode for electronic parts and then baking the coated paste to give an electrode.

6 Claims, No Drawings

NICKEL POWDER, METHOD FOR PREPARING THE SAME AND PASTE FOR USE IN MAKING ELECTRODES FOR ELECTRONIC PARTS

BACKGROUND OF THE INVENTION (a) Field of the Invention

The present invention relates to nickel powder having a specific particle size distribution or specific powder characteristic properties, such nickel powder in which a fatty acid is supported on the surface of the nickel particles, a method for preparing these powdery nickel products and a paste containing such a powdery nickel product and used in making an electrode for electronic parts. More specifically, the present invention pertains to nickel powder having a specific particle size distribution or is suitably used in a paste for making an internal electrode powder characteristic properties, which or an external electrode for electronic parts, in particular, suitably used for preparing a paste for forming an external electrode, such nickel powder, in which a fatty acid is supported on the surface of the nickel particles, a method for preparing these powdery nickel products and a paste containing such a nickel powder product and suitably used for preparing a paste for forming an internal electrode or an external electrode of electronic parts, in particular, suitably used for preparing a paste for forming an external electrode.

(b) Description of the Prior Art

Conventionally, an external electrode (thick film-like electrode) has in general been formed on a ceramic electronic part or element such as a multilayer ceramic capacitor element by applying, onto the part or element, a conductive paste containing powder of a noble metal such as platinum, palladium, silver, a silver-palladium alloy and then baking the applied paste. However, there have recently been developed techniques which make use of base metals such as copper and nickel in place of the foregoing noble metals and an alloy of a noble metal and a base metal such as those disclosed in Japanese Un-Examined Patent Publication No. Hei 6-236707, in order to save the production cost and a great progress has been made in such techniques.

A copper powder-containing paste has widely been used for forming an external electrode for ceramic electronic parts or elements. However, nickel powder has a melting point higher than that of copper powder and the temperature-depending characteristics during sintering of the nickel powder are quite different from those of the copper powder. Accordingly, good moldability upon the formation of an external electrode cannot necessarily be obtained even if using, in a nickel powder-containing paste, nickel powder having a particle size distribution and powder characteristics identical to those of the copper powder used in a copper paste.

An electrode for electronic parts or elements is in general formed by applying a nickel powder-containing paste onto positions on which an internal or external electrode for ceramic electronic parts or elements is formed and then baking the applied paste. However, various problems arise in the practical operations for forming such an electrode. For instance, pores are formed within the resulting electrode and the joining strength of the resulting electrode is insufficient.

SUMMARY OF THE INVENTION

Accordingly, an object of the present invention is to provide nickel powder suitably used in a paste, which permits the formation of an internal or external electrode for electronic parts or elements. As has been described above, such an electrode is in general formed by applying a nickel powder-containing paste onto positions, on which the electrode for ceramic electronic parts or elements is formed, and then baking the applied paste. However, the nickel powder of the present invention permits the formation of a paste, which is not accompanied by the formation of any pores within the resulting electrode, the powder can ensure sufficient joining strength and permits the formation of a dense electrode having good moldability. When the resulting electrode is used as an external electrode and other parts are soldered onto the external electrode, excess solder is not incorporated into the electrode and therefore, cracks are hardly formed.

It is another object of the present invention to provide nickel powder in which a fatty acid is supported on the surface of nickel particles. The presence of the fatty acid on the particle surface permits the improvement of the film density of an electrode produced using the nickel powder and the nickel powder is suitably used for forming not only an external electrode, but also an internal electrode.

It is a still another object of the present invention to provide a paste containing such nickel powder and used for forming an electrode for electronic parts.

It is a further object of the present invention to provide a method for preparing such nickel powder.

The inventors of this invention have conducted various studies to accomplish the foregoing objects and have found that the foregoing problems associated with the conventional techniques can be solved by the use of nickel powder having a specific particle size distribution or powder characteristic properties. More specifically, the inventors have found that pores are not formed within an electrode and the resulting electrode has sufficient joining strength even if such an electrode is formed by applying a paste containing such nickel powder to a substrate and then baking the applied paste and that the resulting electrode is dense and has good moldability. The inventors have further found out the following facts. When the resulting electrode is used as an external electrode and other parts are soldered onto the external electrode, excess solder is not incorporated into the electrode and therefore, cracks are hardly formed. A paste containing nickel powder in which a fatty acid is supported on the surface of the nickel particles can be suitably used for forming not only an external electrode, but also an internal electrode. Such nickel powder having a specific particle size distribution or powder characteristic properties can be prepared by separating nickel particles from an aqueous solution containing a nickel-containing salt and a hydrazine reducing agent without forming any hydroxide as an intermediate. Alternatively, the nickel powder can be prepared by adding an aqueous solution containing a hydrazine reducing agent and an alkali to an aqueous nickel salt solution to thus precipitate nickel without forming any hydroxide as an intermediate. Further, nickel powder on which a fatty acid is supported can be prepared by bringing such nickel powder having a specific particle size distribution or powder characteristic properties into contact with a fatty acid solution. Thus, the inventors of this invention have completed the present invention on the basis of the foregoing findings.

According to a first aspect of the present invention, there is provided nickel powder, wherein the rate of particles having a particle size of not less than 1.2 time the average particle size as determined by the SEM observation is not less than 10% on the basis of the total number of nickel particles and the rate of particles having a particle size of not more than 0.8 time the average particle size as determined by the SEM observation is not less than 10% on the basis of the total number of nickel particles.

In a preferred embodiment, the nickel powder according to the present invention is characterized in that a coefficient of variation (CV) is not less than 30%, in which the CV is determined using an average particle size and a standard deviation obtained on the basis of the Feret diameter as determined by the SEM observation, according to the following equation:

$$CV(\%) = [(\text{Standard Deviation})/(\text{Average Particle Size})] \times 100$$

In another preferred embodiment, the nickel powder of the present invention is characterized in that it has the foregoing specific particle size distribution or powder characteristic properties and that a fatty acid is supported on the surface of the nickel particles.

According to a second aspect of the present invention, there is provided a paste for forming an electrode used in electronic parts. The paste is characterized in that it comprises the foregoing nickel powder.

According to a third aspect of the present invention, there is provided a method for preparing nickel powder. The method comprises the step of precipitating nickel particles from an aqueous solution containing a nickel-containing salt and a hydrazine reducing agent without forming any hydroxide as an intermediate. The method preferably comprises the step of mixing an aqueous solution containing a nickel salt and a hydrazine reducing agent with an alkaline aqueous solution to thus precipitate nickel particles without forming any hydroxide as an intermediate.

Alternatively, the nickel powder of the present invention can likewise be prepared by adding, to an aqueous solution of a nickel salt, an aqueous solution containing a hydrazine reducing agent and an alkali to thus precipitate nickel particles without forming any hydroxide as an intermediate.

According to a fourth aspect of the present invention, there is also provided a method for preparing nickel powder in which a fatty acid is supported on the surface of the nickel particles. This method comprises the step of bringing a fatty acid solution into contact with nickel powder having such a specific particle size distribution or powder characteristic properties to obtain nickel powder provided thereon with the fatty acid supported thereon.

DESCRIPTION OF THE PREFERRED EMBODIMENTS

In the nickel powder of the present invention, the rate of nickel particles, whose particle size is not less than 1.2 time the average particle size, is not less than 10%, preferably not less than 12% and more preferably not less than 15% on the basis of the total number of nickel particles. In addition, the rate of nickel particles, whose particle size is not more than 0.8 time the average particle size, is not less than 10%, preferably not less than 15% and more preferably not less than 20% on the basis of the total number of nickel particles. In this respect, the particle size of the nickel particles is determined by the SEM observation.

Moreover, the nickel powder of the present invention has a coefficient of variation (CV) of not less than 30%, preferably not less than 35% and more preferably not less than 40%.

An excellent and dense electrode can be formed by applying a paste containing nickel powder having such a wide particle size distribution or powder characteristic properties to internal or external electrode-forming positions on a substrate and then baking the coated paste. The resulting electrode is not accompanied by the formation of any pore and has sufficient joining strength and has good moldability. For this reason, when the resulting electrode is used as an external electrode and other parts are soldered onto the external electrode, excess solder is not incorporated into the electrode and therefore, cracks are hardly formed. Accordingly, the nickel powder of the present invention is quite suitable as a material for forming an external electrode on a ceramic electronic part or element. Moreover, the paste containing nickel powder having such a wide particle size distribution or powder characteristic properties according to the present invention is quite suitably used as a paste for forming an electrode on an electronic part.

In addition, the tap density of nickel powder greatly affects the packing ability of the nickel powder in a conductive paste and in turn the moldability and denseness of the resulting electrode. Accordingly, the nickel powder of the present invention should preferably have a tap density of not less than 2.5 g/cm$^3$, more preferably not less than 3 g/cm$^3$ and still further preferably not less than 4 g/cm$^3$.

The nickel powder, on which a fatty acid is supported, according to the present invention can be prepared by bringing nickel powder having the foregoing wide particle size distribution or powder characteristics into contact with a fatty acid solution to thus apply the fatty acid onto the surface of the nickel particles. In this respect, the fatty acid may be a saturated fatty acid represented by the following general formula: $C_nH_{2n+1}COOH$ or an unsaturated fatty acid represented by, for instance, the following general formula:

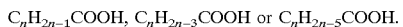

$$C_nH_{2n-1}COOH, \ C_nH_{2n-3}COOH \ \text{or} \ C_nH_{2n-5}COOH.$$

Examples of such saturated fatty acids usable herein are enanthic acid, caprylic acid, pelargonic acid, capric acid (or decanoic acid), undecylic acid, lauric acid, tridecylic acid, myristic acid, pentadecylic acid, palmitic acid, heptadecylic acid, stearic acid, nonadecanoic acid, arachic acid and behenic acid. On the other hand, examples of unsaturated fatty acids usable herein are acrylic acid, crotonic acid or isocrotonic acid, undecenoic acid, oleic acid or elaidic acid, cetoleic acid, brassidic acid or erucic acid, sorbic acid, linoleic acid, linolenic acid and arachidonic acid.

In the nickel powder, on which a fatty acid is supported, according to the present invention, the higher the supported amount of the fatty acid, the higher the tap density of such nickel powder. Thus, the use of a paste containing such nickel powder permits the improvement of the density of the film of the paste as determined after drying and also permits the formation of an electrode having a high density. Such an effect distinctly reveals when the supported amount of the fatty acid reaches not less than 0.01% by mass and the effect conspicuously reveals when the supported amount thereof reaches not less than 0.05% by mass. When the supported amount of the fatty acid is further increased and a paste is prepared using such nickel powder, which supports a large amount of the fatty acid, however, a part of the fatty acid supported on the surface of the nickel particles is released from the surface of the nickel particles and diffuses into the paste. Therefore, the supported amount of the fatty acid is preferably 0.01 to 1% by mass and more preferably 0.05 to 0.5% by mass.

In the nickel powder, on which a fatty acid is supported, according to the present invention, if the fatty acid is supported on the nickel particles in an amount specified above, nickel powder having a tap density of not less than 4.5 g/cm$^3$ can be prepared. The use of a paste comprising nickel powder having such a high tap density permits the improvement of the film density of the paste as determined after drying. This in turn permits the formation of an electrode having a high density and accordingly, such a paste permits the formation of not only an external electrode for a multilayer ceramic capacitor, but also an internal electrode therefor.

In addition, the nickel powder of the present invention preferably has an average particle size ranging from 0.1 to 1 μm irrespective of whether the fatty acid is supported on the surface of the nickel particles or not. A conductive paste containing such nickel powder is particularly suitable for use as a paste for forming an external electrode of electronic parts. In case where the fatty acid is supported on the surface of the nickel particles, a conductive paste containing such nickel powder may be used for forming a paste for producing an internal electrode of electronic parts.

In this connection, the nickel particles constituting the nickel powder and the nickel powder supporting a fatty acid on the surface thereof may be elemental nickel powder. Moreover, the nickel particles may likewise be nickel powder in which each fine nickel particle contains a metal oxide within the same or nickel powder in which the surface of each fine particle is covered with a metal oxide. However, preferably used herein is nickel powder in which the surface of each fine particle is uniformly covered with a metal oxide, while taking into consideration the improvement of resistance to oxidation and resistance to diffusion of nickel encountered when removing the binder upon production of a multilayer ceramic capacitor and the improvement of the resistance to heat shrinkage. The amount of the coated metal oxide preferably ranges from about 0.05 to 10% by mass on the basis of the total mass of the elemental nickel particles.

Such metal oxides may be oxides and double oxides containing at least one member selected from the group consisting of metal elements belonging to the Groups 2 to 14 of the Periodic Table, whose atomic number falls within the range of from 12 to 82. Preferably, such metal oxides may be oxides and double oxides containing at least one member selected from the group consisting of metal elements belonging to the Groups 2, 3, 4, 7, 13 and 14 of the Periodic Table, whose atomic number falls within the range of from 12 to 82. Specific examples thereof are MgO, CaO, SrO, BaO, ZnO, $Al_2O_3$, $Ga_2O_3$, $Y_2O_3$, $SiO_2$, $TiO_2$, $ZrO_2$, $Cr_2O_3$, $MnO_2$, $Mn_3O_4$, PbO, $Nb_2O_5$, $Nd_2O_3$, $Sm_2O_3$, $Dy_2O_3$, $Er_2O_3$, $Ho_2O_3$, $BaTiO_3$, $CaTiO_3$, $SrTiO_3$, $MgTiO_3$, $BaZrO_3$, $CaZrO_3$, $SrZrO_3$, $(Mg, Ca)TiO_3$, $(Ba, Ca)(Ti, Zr)O_3$, $PbTiO_3$, $Pb(Zr, Ti)O_3$, $(Pb, Ca)TiO_3$, $MgAl_2O_4$, and $BaTi_4O_9$. These oxides and double oxides may be used alone or in any combination of at least two of them. These oxides and double oxides may be doped with an oxide of a metal such as Nb, W, La, Y and/or Mo.

The nickel powder in which the surface of each nickel particle constituting the nickel powder is covered with the foregoing metal oxide can be prepared by any known method such as a wet-supporting method, a dry-supporting method and a precursor-supporting and thermal modification method.

The wet-supporting method comprises the steps of, for instance, adding an aqueous solution containing at least one member selected from the group consisting of water-soluble salts of metal elements belonging to the Groups 2 to 14 of the Periodic Table and whose atomic number ranges from 12 to 82 to a slurry in which metal nickel fine particles are dispersed; and then adjusting the pH value of the slurry with either an acid or an alkali to thus attach the metal oxide and/or double oxide derived from the water-soluble salts to the surface of the nickel fine particles.

The dry-supporting method comprises the steps of, for instance, adhering, to the surface of nickel fine particles, at least one member selected from the group consisting of ultrafine particles of oxide and double oxides containing at least one member selected from the group consisting of metal elements belonging to the Groups 2 to 14 of the Periodic Table and whose atomic number ranges from 12 to 82; and then leading the nickel fine particles, to which the ultrafine particles are attached, to collide with one another or with other bodies to thus attach the ultrafine particles to the surface of the nickel fine particles.

The precursor-supporting and thermal modification method comprises the steps of, for instance, bringing nickel fine particles into contact with a solution containing a combination of soluble titanium-containing compound and a soluble barium-containing compound, which can form barium titanate having a perovskite structure through a heat-treatment at a temperature of not less than 400° C. to thus attach a precursor consisting of the reaction product of the soluble titanium-containing compound and the soluble barium-containing compound to the surface of the individual nickel fine particles; then drying; and subjecting the nickel fine particles provided thereon with the precursor attached thereto to a heat-treatment at a temperature of not less than 400° C. to thus give nickel powder which is surface-modified with barium titanate having a perovskite structure.

The paste for forming an electrode for electronic parts according to the present invention is characterized in that it comprises the foregoing nickel powder of the present invention. The paste comprises, for instance, the foregoing nickel powder of the present invention, a resin and a solvent. More specifically, the resin may be, for instance, cellulose derivatives such as ethyl cellulose; vinyl non-curable resins such as acrylic resins, polyvinyl butyral resins and polyvinyl alcohol; and thermosetting resins such as epoxy resins and acrylics, with the simultaneous use of a peroxide being preferred. In addition, it is also possible to use UV-curable resins and electron beam-curable resins such as products modified with acrylic acid, products modified with methacrylic acid and unsaturated polyesters, e.g., epoxy acrylate, polybutadiene acrylate and urethane acrylate. Moreover, examples of optical initiators for the UV-curable resins are benzoin, acetophenone, benzyl, benzophenone and benzoin butyl ether. In addition, examples of solvents are terpineol, tetralin, butyl carbitol and carbitol acetate, which may be used alone or in any combination. The paste may if necessary comprise glass frits. The paste for forming an electrode for electronic parts according to the present invention can be prepared by mixing, with stirring, the foregoing raw materials in a mixing machine such as a ball mill or a three-roll mill.

Then we will explain the method of the present invention. The nickel powder of the present invention is prepared by precipitating nickel particles from an aqueous solution containing a nickel salt and a hydrazine reducing agent without forming any hydroxide as an intermediate. Preferably, the nickel powder is prepared by mixing an alkaline aqueous solution with an aqueous solution containing a nickel salt and a hydrazine reducing agent to thus precipitate nickel particles without forming any hydroxide as an intermediate. Alternatively, the nickel powder is preferably prepared by adding an aqueous solution containing a hydrazine reducing agent and an alkali to a nickel salt aqueous solution to thus precipitate nickel particles without forming any hydroxide as an intermediate.

The conventional wet synthesis method of nickel powder in general comprises the steps of reacting an aqueous solution of a nickel salt with an alkaline aqueous solution to form nickel hydroxide and then adding a reducing agent to the reaction system to reduce the nickel hydroxide into metal nickel powder. In addition, there has been proposed a method comprising the step of introducing an aqueous solution of a nickel salt into a reducing aqueous solution containing a reducing agent and an alkali to form metal nickel powder.

Contrary to this, a first embodiment of the method for preparing nickel powder according to the present invention, for instance, comprises the step of mixing an aqueous solution containing a nickel salt and a hydrazine reducing agent (in this aqueous solution, the nickel salt and the hydrazine reducing agent form a complex) with an aqueous solution of an alkali such as sodium hydroxide or potassium hydroxide in such a ratio that the amount of the alkali hydroxide is not less than 1.5 mole and preferably not less than 2 moles per mole of nickel, at a temperature of not less than 50° C. and preferably not less than 60° C., to thus precipitate nickel particles without forming any hydroxide of nickel as an intermediate. The mixing operation may be carried out either by stirring the aqueous solution containing a nickel salt and a hydrazine reducing agent while the aqueous alkaline solution is dropwise added to the former to reduce the nickel salt; or by stirring the alkaline aqueous solution while dropwise adding, to the alkaline solution, the aqueous solution containing a nickel salt and a hydrazine reducing agent to thus reduce the nickel salt. In this respect, the particle size of the resulting nickel particles is affected by the rate of addition of the solution, but the rate is not restricted to any specific one. For instance, if nickel sulfate and hydrazine monohydrate are used, nickel sulfate-hydrazine complex is formed and the pH value of the solution is maintained at a high level with an alkali to thus directly precipitate nickel particles without forming any hydroxide of nickel as an intermediate. Such a production method permits the stable formation of nickel powder having a desired wide particle size distribution or powder characteristics at a time.

In this connection, when preparing the aqueous solution containing a nickel salt and a hydrazine reducing agent used in such a production method, a gel is formed if the aqueous nickel salt solution and the hydrazine reducing agent are rapidly mixed together and therefore, they are gradually mixed with one another. In this respect, the hydrazine reducing agent may gradually be added to the aqueous nickel salt solution or the former is gradually added to the latter. After the completion of the addition, the resulting mixture is sufficiently stirred.

A second embodiment of the method for preparing nickel powder according to the present invention comprises the step of adding an aqueous solution containing a hydrazine reducing agent and an alkali to an aqueous solution of a nickel salt to thus precipitate nickel particles without forming any hydroxide. In this embodiment, the aqueous solution containing a hydrazine reducing agent and an alkali is preferably dropwise added to the aqueous nickel salt solution with stirring the latter to reduce the nickel salt. This method permits the stable production of nickel powder having a desired wide particle size distribution or powder characteristic properties, at a time.

Examples of nickel salts used in the first and second embodiments of the present invention are nickel sulfate, nickel nitrate and nickel halides such as nickel chloride. In the production method of the present invention, nickel particles are precipitated without forming any hydroxide of nickel and therefore, nickel hydroxide is not used as such a nickel salt. In addition, examples of hydrazine reducing agents are hydrazine, hydrated hydrazine, hydrazine sulfate, hydrazine carbonate, and hydrazine hydrochloride.

The method for preparing nickel powder in which a fatty acid is supported on the surface of the nickel particles comprises the step of bringing the foregoing nickel powder having a desired wide particle size distribution or powder characteristic properties and prepared according to the foregoing method into contact with a fatty acid solution to thus attach the fatty acid to the surface of the nickel particles. More specifically, this production method preferably comprises the steps of, for instance, mixing nickel powder with a solution of a fatty acid in a diluting solvent to make the surface of the nickel particles compatible with the solution, then removing the excess solution by, for instance, filtration under reduced pressure and drying the nickel powder. Such a diluting solvent may be any one so far as it can dissolve the fatty acid and specific examples thereof are acetone, ethanol, methanol and propanol.

As has been discussed above, the adhesion of a fatty acid to the surface of metal nickel fine particles can increase the tap density of the nickel powder. In addition, the use of a paste containing such nickel powder permits an increase in the film density observed after drying and also permits the formation of an electrode having a high density. Therefore, the thickness of the paste required for obtaining an electrode having a desired thickness can be reduced and this accordingly results in the reduction of the volume change during firing. The reason why the nickel powder of the present invention shows such effects would be that the fatty acid is preferentially and strongly attachd to, for instance, the oxide and hydroxide present on the surface of the nickel fine particles. Moreover, this in turn results in the improvement of the wettability of the nickel fine particles with the organic components present in the paste.

The present invention will hereunder be described in more detail with reference to the following working Examples and Comparative Examples, but the present invention is not restricted to these specific Examples at all.

EXAMPLE 1

Nickel sulfate hexahydrate (nickel content 22.2% by mass; 263 g) was dissolved in 500 ml of pure water, then 180 g of hydrazine monohydrate was added to the aqueous solution and the resulting mixture was sufficiently stirred, while maintaining the mixture at 60° C. To this mixed solution, there was dropwise added 100 ml of a 120 g/l aqueous sodium hydroxide solution over 30 minutes to react them and to precipitate nickel fine particles. The nickel fine particles thus prepared were washed with pure water till the pH of the wash liquid reached to a level of not more than 9, followed by filtration and drying to give desired nickel powder.

The nickel powder was observed by an SEM with a magnification of ×10000 and 5 visual fields were randomly selected to thus determine the particle size of 1500 particles in all present in the visual fields. As a result, the average particle size was found to be 0.88 $\mu$m, the rate of particles whose particle size exceeded 1.06 $\mu$m (0.88×1.2=1.056) was found to be 13% relative to the total number of particles, while the rate of particles whose particle size was less than 0.70 $\mu$m (0.88×0.8=0.704) was found to be 38% relative to the total number of particles examined. The standard deviation $\sigma$ of the particle size distribution for the nickel powder was found to be 0.268 and therefore, the coefficient of variation (CV) was determined to be 30.5%. Moreover, the tap density of the nickel powder was found to be 3.49 g/cm$^3$.

The internal electrode produced using the nickel powder of the present invention thus prepared above was evaluated according to the following method.

To 100 parts by mass of the foregoing nickel powder, there was added a binder comprising 8 parts by mass of ethyl cellulose, 100 parts by mass of terpineol and 12 parts by mass of butyl carbitol, followed by mixing these ingredients. Then the resulting mixture was kneaded in a roll mill to give a conductive paste. The paste thus prepared was printed on a polyimide (PI) film (UPIREX available from Ube Industries, Ltd.; thickness: 125 $\mu$m) through a 380 mesh screen mask of Tetoron (the size of the printed pattern: 4 cm×4 cm). The printed PI film was subjected to leveling at room temperature for 15 minutes and then temporarily dried in a hot air-circulated thermostatic dryer set at 60° C. over 30 minutes. Further, the PI film was transferred to a hot air-circulated thermostatic dryer set at 120° C. over 60 minutes to subject the PI film to a main curing operation. The film was removed from the dryer, allowed to cool to room temperature and then the film density was determined. The film density was found to be 4.9 g/cm$^3$.

The external electrode produced using the nickel powder of the present invention was evaluated by the following method.

To 100 parts by mass of the foregoing nickel powder, there were added 25 parts by mass of terpineol, 10 parts by mass of ethyl cellulose and 5 parts by mass of an SiO$_2$—Al$_2$O$_3$-alkaline earth metal glass frits and the resulting mixture was admixed together. Then the resulting mixture was kneaded in a roll mill to give a conductive paste. The resulting paste was printed on a green sheet of barium titanate through a 380 mesh screen mask of Tetoron. The printed green sheet was subjected to leveling at room temperature for 15 minutes and then temporarily dried in a hot air-circulated thermostatic dryer set at 60° C. over 30 minutes. Further, the printed green sheet was transferred to a hot air-circulated thermostatic dryer set at 120° C. over 60 minutes to subject the printed green sheet to a main curing operation. Thereafter, the green sheet was fired at 980° C. for 3 hours in a nitrogen gas atmosphere containing 2% of hydrogen gas to give a film. The appearance of the film was observed with the naked eyes. The film was found to be a dense film.

The results of the foregoing determination and observation are summarized in the following Table 1.

EXAMPLE 2

To 100 ml of a 120 g/l aqueous solution of sodium hydroxide, there was added 180 g of hydrazine monohydrate to give an alkali reducing solution. Nickel sulfate hexahydrate (nickel content: 22.2% by mass; 263 g) was dissolved in 500 ml of pure water to give a nickel sulfate aqueous solution, the aqueous solution was maintained at 60° C. To the aqueous solution, there was dropwise added the foregoing alkaline reducing solution over 10 minutes to react them and to thus precipitate nickel fine particles. The nickel fine particles thus prepared was washed with pure water till the pH of the wash liquid reached to a level of not more than 9, followed by filtration and drying to give desired nickel powder. The nickel powder was inspected for various characteristic properties according to the same methods used in Example 1. Moreover, a paste was prepared by the same method used in Example 1, a film serving as an internal electrode was prepared and inspected for the film density by the same method used in Example 1. In addition, a film serving as an external electrode was prepared and the appearance thereof was observed with the naked eyes by the same methods used in Example 1. The results of the foregoing determination and observation are summarized in the following Table 1.

EXAMPLE 3

Oleic acid (0.5 ml) was dropwise added to 100 ml of acetone and the resulting mixture was stirred to give an acetone solution. To the resulting acetone solution, there was added 100 g of nickel powder prepared according to the method described in Example 1, followed by sufficient stirring. Thereafter, the excess acetone solution was removed by filtration under reduced pressure and then the nickel powder was dried overnight at 70° C. to give nickel powder in which oleic acid was supported on the surface of the individual nickel fine particles. The resulting nickel powder was inspected for various characteristic properties according to the same methods used in Example 1. Moreover, a paste was prepared by the same method used in Example 1, a film serving as an internal electrode was prepared and inspected for the film density by the same method used in Example 1. In addition, a film serving as an external electrode was prepared and the appearance thereof was observed with the naked eyes by the same methods used in Example 1. The results of the foregoing determination and observation are summarized in the following Table 1.

EXAMPLE 4

The same procedures used in Example 3 were repeated except that stearic acid was substituted for the oleic acid used in Example 3 to thus obtain nickel powder in which stearic acid was supported on the surface of the individual nickel fine particles. The resulting nickel powder was inspected for various characteristic properties according to the same methods used in Example 1. Moreover, a paste was prepared by the same method used in Example 1, a film serving as an internal electrode was prepared and inspected for the film density by the same method used in Example 1. In addition, a film serving as an external electrode was prepared and the appearance thereof was observed with the naked eyes by the same methods used in Example 1. The results of the foregoing determination and observation are summarized in the following Table 1.

Example 5 (Comparative Example)

Nickel sulfate hexahydrate (263 g; nickel content: 22.2% by mass) was dissolved in 500 ml of pure water, followed by gradual dropwise addition of 100 ml of a 120 g/l aqueous sodium hydroxide solution to the resulting aqueous solution with stirring to precipitate nickel hydroxide. After heating the resulting suspension to 60° C., 180 g of hydrazine monohydrate was dropwise added to the suspension over 15 minutes with stirring to reduce the nickel hydroxide into metal nickel. The nickel fine particles thus prepared was washed with pure water till the pH of the wash liquid reached to a level of not more than 9, followed by filtration and drying to give desired nickel powder. The nickel powder was inspected for various characteristic properties according to the same methods used in Example 1. Moreover, a paste was prepared by the same method used in Example 1, a film serving as an internal electrode was prepared and inspected for the film density by the same method used in Example 1. In addition, a film serving as an external electrode was prepared and the appearance thereof was observed with the naked eyes by the same methods used in Example 1. The results of the foregoing determination and observation are summarized in the following Table 1.

Example 6 (Comparative Example)

To 100 ml of acetone, there was dropwise added 0.5 ml of oleic acid, followed by stirring the resulting mixture to give an acetone solution. Then, to the resulting acetone solution, there was added 100 g of nickel powder prepared according to the method described in Example 5 (Comparative Example), followed by sufficient stirring. Thereafter, the excess acetone solution was removed by filtration under reduced pressure and then the nickel powder was dried overnight at 70° C. to give nickel powder in which oleic acid was supported on the surface of the individual nickel fine particles. The resulting nickel powder was inspected for various characteristic properties according to the same methods used in Example 1. Moreover, a paste was prepared by the same method used in Example 1, a film serving as an internal electrode was prepared and inspected for the film density by the same method used in Example 1. In addition, a film serving as an external electrode was prepared and the appearance thereof was observed with the naked eyes by the same methods used in Example 1. The results of the foregoing determination and observation are summarized in the following Table 1.

TABLE 1

| Example No. | Average particle size d ($\mu$m) | Rate of $\geq$1.2 d particles (%) | Rate of $\leq$0.8 d particles (%) | Standard deviation of particle size ($\mu$m) | Coefficient of variation (%) | Tap density (g/cm$^3$) | Film density (g/cm$^3$) | Kind of fatty acid | Amount of fatty acid supported (% by mass) | Visual appearance of film formed |
|---|---|---|---|---|---|---|---|---|---|---|
| 1 | 0.88 | 13 | 38 | 0.268 | 30.5 | 3.49 | 4.9 | | | Dense film |
| 2 | 0.55 | 16 | 27 | 0.207 | 37.6 | 3.47 | 4.7 | | | Dense film |
| 3 | 0.86 | 15 | 33 | 0.271 | 31.5 | 5.13 | 5.6 | oleic acid | 0.07 | Dense film |
| 4 | 0.87 | 15 | 36 | 0.265 | 30.5 | 4.76 | 5.4 | stearic acid | 0.07 | Dense film |
| 5* | 0.59 | 2 | 5 | 0.116 | 19.7 | 3.21 | 4.2 | | — | Porous film |
| 6* | 0.58 | 3 | 4 | 0.168 | 23.3 | 4.31 | 5.1 | oleic acid | 0.13 | Porous film |

*: Comparative Example

As will be seen from the data listed in Table 1, The nickel powder of Examples 1 to 4 falling within the scope of the present invention comprises, on the basis of the total number of particles, not less than 10% of particles having a particle size of not less than 1.2 time the average particle size as determined by the SEM observation and not less than 10% of particles having a particle size of not more than 0.8 time the average particle size. Nevertheless, the nickel powder of the present invention has a high tap density and the density, as determined after drying, of the film formed from a paste prepared using such nickel powder is also high. Therefore, the nickel powder of the present invention permits the formation of a dense external electrode having good moldability. In addition, the nickel powder of Examples 3 to 4, which are treated with a fatty acid are further improved in the tap density and the dry film density and therefore, the nickel powder is suitable for use in a paste for forming an electrode of all sorts of electronic parts.

Contrary to this, the nickel powder products of Examples 1 to 2 (Comparative Examples), which are beyond the scope of the present invention, never show any particle size characteristics specified in the present invention, irrespective of whether they are subjected to a treatment with a fatty acid. Therefore, they have low tap densities and they also have low dry film densities. As a result, the external electrode produced from these nickel powder products is insufficient in the appearance.

As has been described above in detail, a conductive paste containing the nickel powder having a specific particle size distribution or powder characteristic properties according to the present invention can be applied onto the positions on which an internal or external electrode for electronic parts is formed and then baking the coated paste to give an electrode. In this connection, any pore is not formed on the resulting electrode, the electrode ensures sufficient joining strength and the electrode is dense and have good moldability. When the resulting electrode is used as an external electrode and other parts are soldered onto the external electrode, excess solder is not incorporated into the electrode and therefore, cracks are hardly formed. Moreover, the fatty acid-supporting nickel powder of the present invention has a higher density and the use of a paste containing such nickel powder permits the improvement of the dry film density and therefore, the paste permits the formation of an electrode having a high density. This in turn permits the reduction of the thickness of the paste required for forming an electrode having a desired thickness and thus the paste can likewise be used for forming an internal electrode for multilayer ceramic capacitors. The production method of the present invention permits the stable production of such nickel powder.

What is claimed is:

1. Nickel powder comprising, on the basis of the total number of particles, at least 10% of particles whose particle size is at least 1.2 times the average particle size, as determined by SEM observation; and at least 10% of particles whose particle size is not more than 0.8 times the average particle size, as determined by SEM observation; having a coefficient of variation (CV) at least of 30%, in which the CV is determined using an average particle size and a standard deviation obtained on the basis of the Feret diameter as determined by the SEM observation, according to the following equation:

$$CV(\%) = ((\text{Standard Deviation})/(\text{Average Particle Size})) \times 100;$$

and having a tap density of not less than 2.5 g/cm$^3$.

2. The nickel powder as set forth in claim 1, wherein a fatty acid is supported on the surface of the individual nickel particles.

3. The nickel powder as set forth in claim 2, wherein the amount of the fatty acid supported on the surface ranges from 0.01 to 1% by mass on the basis of the mass of the nickel powder.

4. The nickel powder as set forth in claim 2, wherein the nickel powder has a tap density of at least 4.5 g/cm$^3$.

5. The nickel powder as set forth in claim 1, wherein the nickel powder has an average particle size ranging from 0.1 to 1 $\mu$m.

6. A paste for forming an electrode of electronic parts comprising nickel powder as set forth in claim 1.

* * * * *